United States Patent
Gellas (10) Patent No.: US 9,754,126 B2
(45) Date of Patent: Sep. 5, 2017

(54) VIRTUAL INPUT MECHANISM FOR SECURE DATA ACQUISITION

(71) Applicant: Verizon Patent and Licensing Inc., Basking Ridge, NJ (US)

(72) Inventor: Michael Gellas, Warren, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 44 days.

(21) Appl. No.: 14/881,384

(22) Filed: Oct. 13, 2015

(65) Prior Publication Data
US 2017/0103229 A1   Apr. 13, 2017

(51) Int. Cl.
G06F 21/62    (2013.01)
G06F 21/60    (2013.01)
H04L 29/06    (2006.01)
G06F 21/78    (2013.01)

(52) U.S. Cl.
CPC ........ *G06F 21/6245* (2013.01); *G06F 21/602* (2013.01); *G06F 21/78* (2013.01); *H04L 63/0428* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0004896 A1* | 1/2003 | Watlington | .......... | G06Q 20/382 705/72 |
| 2003/0101339 A1* | 5/2003 | Bianchini | ............ | G06Q 20/382 713/153 |
| 2004/0044627 A1* | 3/2004 | Russell | .................. | G06Q 20/00 705/50 |
| 2004/0133778 A1* | 7/2004 | Madani | .................... | G06F 21/36 713/168 |
| 2007/0204329 A1* | 8/2007 | Peckover | ................ | G06F 21/10 726/3 |
| 2009/0299887 A1* | 12/2009 | Shiran | .................... | G06Q 30/02 705/35 |
| 2012/0137372 A1* | 5/2012 | Shin | ........................ | H04L 9/088 726/26 |
| 2013/0024924 A1* | 1/2013 | Brady | .................. | G06Q 10/107 726/7 |
| 2015/0032538 A1* | 1/2015 | Calman | .............. | G06Q 30/0255 705/14.53 |
| 2015/0137944 A1* | 5/2015 | Fuerth | ................... | H04L 63/083 340/5.85 |
| 2015/0310199 A1* | 10/2015 | Patel | .................... | G06F 3/04886 726/30 |
| 2016/0034696 A1* | 2/2016 | Jooste | ..................... | G06F 1/163 726/1 |
| 2016/0204937 A1* | 7/2016 | Edwards | ............... | G06F 19/322 713/168 |

* cited by examiner

*Primary Examiner* — Taghi Arani
*Assistant Examiner* — Phy Anh Vu (57) ABSTRACT

A prompt for input data in a user interface (UI) is detected. An input window to receive the input data is presented, and the input data is received via the input window. The input data is encrypted by the input window, and the encrypted data is stored to a memory. A copy of the stored encrypted data is forwarded to a server device. In one example, portions of the encrypted data may be forwarded to the server device in separate transmissions.

20 Claims, 10 Drawing Sheets

VIRTUAL INPUT MECHANISM FOR SECURE DATA ACQUISITION

BACKGROUND

Sensitive information, such as personal, medical, contact, and/or financial account data associated with a user, may be potentially vulnerable to unauthorized access through several different types of security risks. Secure Hypertext Transfer protocol (HTTPS) may provide a secure socket for transmitting sensitive information in encrypted format across a network, such as the Internet. However, the sensitive information may be present on the computing device in an unencrypted (e.g., discoverable) form. For example, if the computing device is lost, sensitive data stored on the computing device may be accessed by someone finding the computing device. Even if the user retains physical custody of the computing device, keystroke loggers, memory scrapers, or other types of malware loaded on the computing device may locate and forward the unencrypted, stored sensitive information to an unauthorized recipient. Even if the user's computing device is secure, when the user transmits the sensitive information to an authorized third-party, such as a payment processing entity, the sensitive data may be encrypted for transmission but may be improperly accessed after being decrypted and stored by the third-party.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

In certain systems and methods described herein, a prompt for input data in a user interface (UI) may be detected, and a determination may be made regarding whether the prompt includes a request for sensitive data. For example, one or more terms associated with the prompt may be identified, and the one or more terms may be evaluated to determine whether they are associated with sensitive data. An input window to receive the input data may be presented when the prompt requests sensitive data, and the sensitive data may be received via the input window. For example, the input window may be positioned over the input field, and the input field may be deactivated. The input data may be encrypted when received in the input window and before being stored in a system memory, and the encrypted data may be forwarded, for example, to a server device.

Figure 1A:
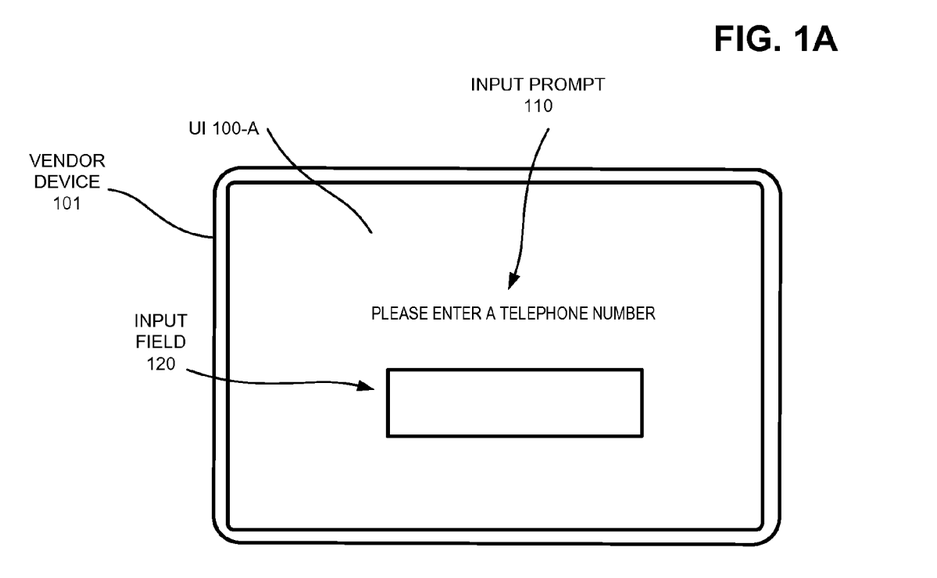
FIGS. 1A-1C show exemplary portions of a user interface (UI) that may be presented by a user device in certain implementations.
Figure 1B:
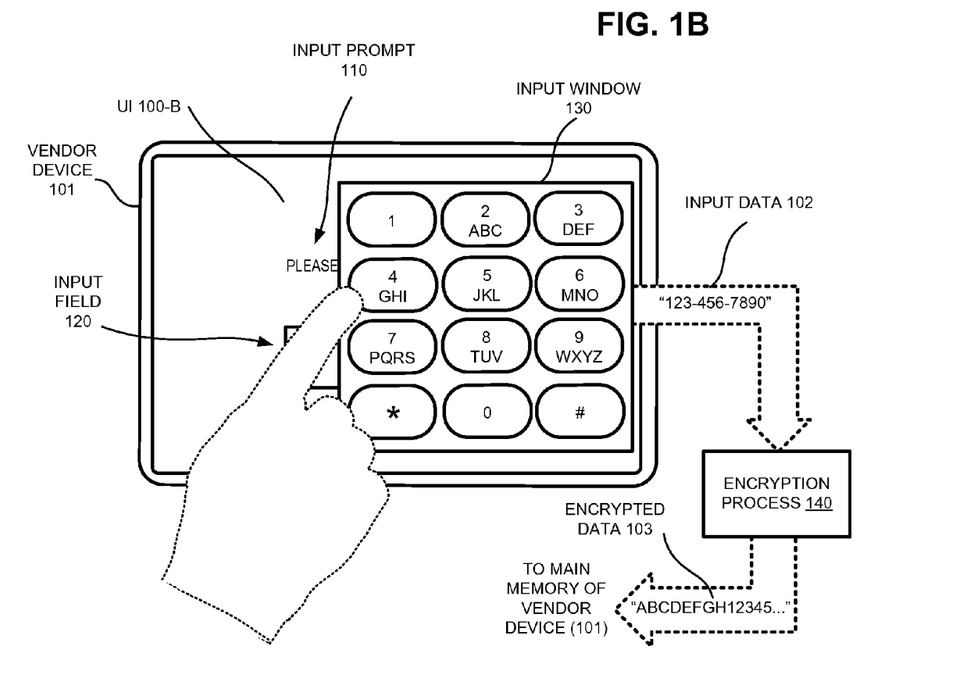
Figure 1C:
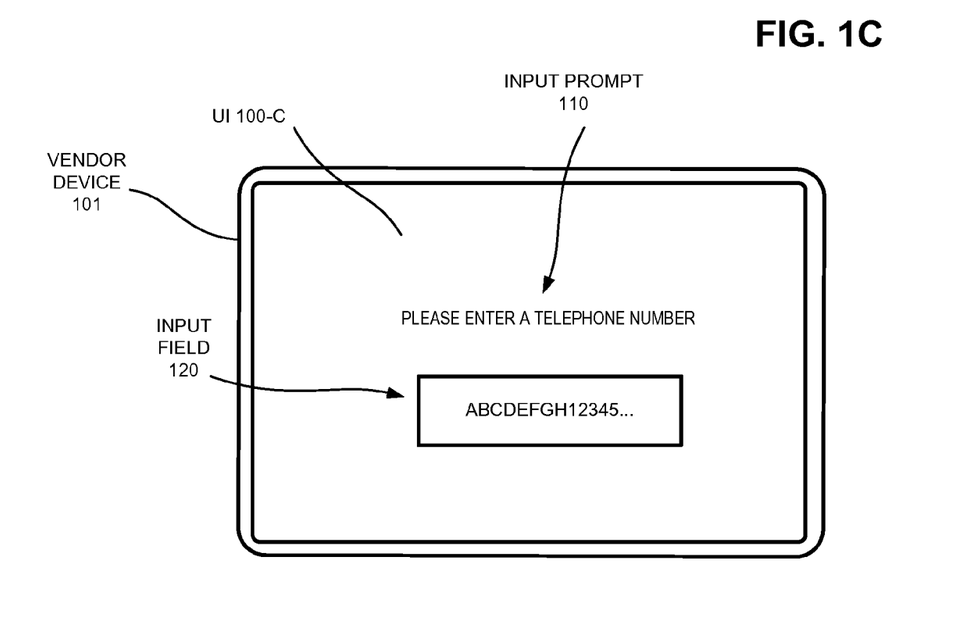

FIGS. 1A-1C show exemplary portions of a user interface (UI) 100 (shown in FIGS. 1A, 1B, and 1C as UIs 100-A, 100-B, and 100-C, respectively) that may be presented by a vendor device 101 in certain implementations. As shown in FIG. 1A, UI 100-A may present an input prompt 110 ("Please enter the telephone number?" in FIG. 1A) and an input field 120 positioned to receive data in response to input prompt 110. For example, UI 100-A may correspond to a webpage presenting a form, such as a hypertext markup language (HTML) form (or web form) or an extended markup language (XML) form (or XFORM), that allows a user to enter data that is sent to a remote device (e.g., a server) for processing, such as processing a payment.

As shown in FIG. 1A, input field 120 may include a text box that is adapted to receive, when selected (e.g., clicked) by a user, textual input from a user via an input device, such as a keyboard or other device. In other instances, UI 100-A may include other types of input interfaces, such as a radio button or check boxes that allow a user to select from different display values/options or a drop-down list that displays a list of items from which a user may select. A user may fill out a form shown in UI 100-A using, for example, the checkboxes, the radio buttons, the drop-down menus, and/or the text fields. For example, UI 100-A may be part of a form that is completed by a vendor (e.g., a store) to enter shipping or credit card data for the user. A user, such as a customer service representative, may enter data into input field 120 using an input device, such as a keyboard. Data received via input field 120 may be stored to the main system memory of vendor device 101 before being transmitted.

In one implementation, input field 120 may correspond to a virtual keyboard or other mechanism to receive data at an operating system level. For example, vender device 101 may correspond to a device, such as a tablet, that receives data via a touch screen, Bluetooth® keyboard, USB keyboard, or other input device.

In one implementation shown in FIG. 1B, UI 100-B may provide an exemplary input window 130. Input window 130 may be positioned to at least partially cover input field 120. Input window 130 may correspond to a graphical mechanism that enables a user to input data associated with input field 120 without using a keyboard. For example, a user may move a graphical selection object, such as a cursor using an input device such as a mouse or touch pad, to a portion of input window 130 to make a selection associated with a number, letter, or other data associated with the selected portion of input window 130. In another example, vendor device 101 may present UI 100-B on a display device, such as a touch screen, that detects contact or presence of a user (or a pointing device such as a stylus), and the user may make a selection associated with a number, letter, or other data by selecting an associated displayed portion of input window 130.

Figure 6:
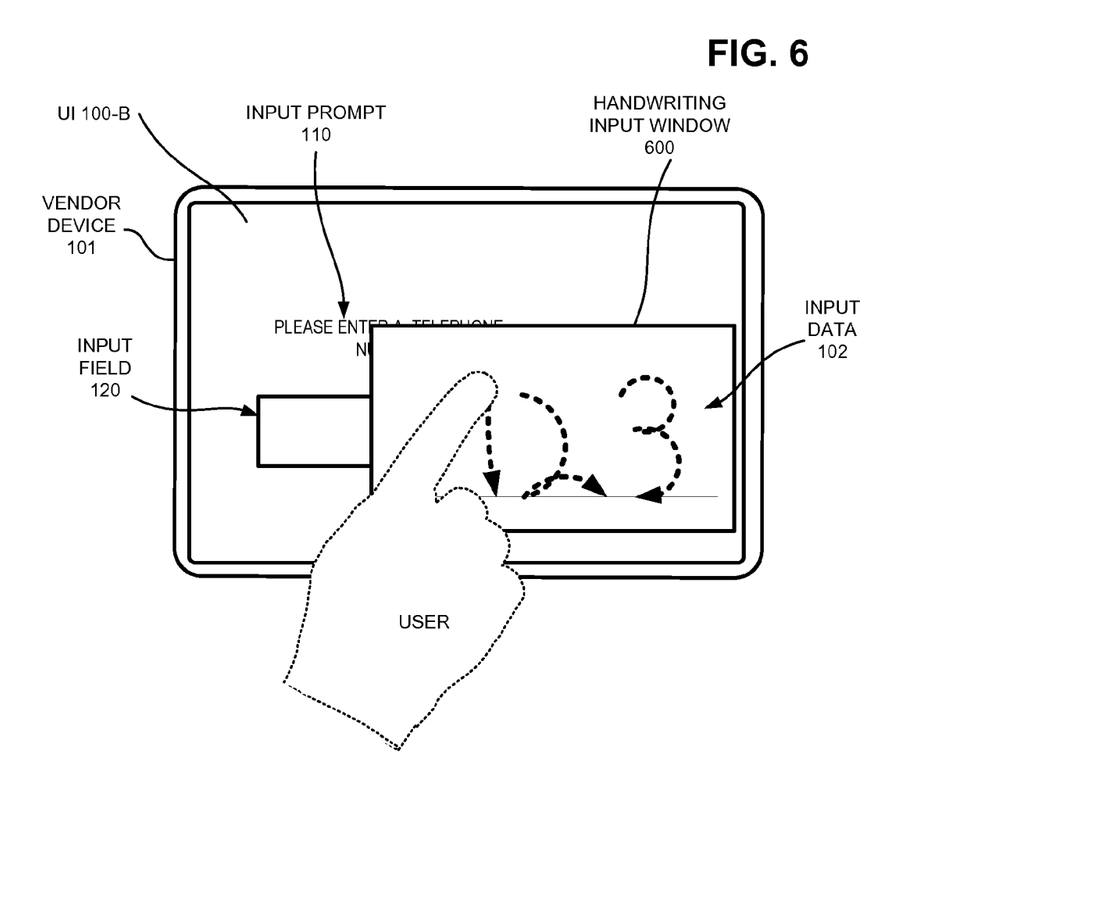
FIGS. 6, 7A, and 7B show exemplary input windows that may be presented in the UI shown in FIGS. 1A-1C.

In the example shown in FIG. 1B, UI 100-B may include input window 130 that corresponds to a graphical representation of a numerical keypad, and a user may select one of the numbers by selecting an associated region of the keypad. In another example, input window 130 may correspond to a virtual keyboard that presents alphanumeric characters and/or other symbols. In yet another example, input window 130 may correspond to a window for receiving handwriting from the user (e.g., as depicted in FIG. 6), and vendor device 101 may then interpret the handwriting to determine the intended input. Additionally, or alternatively, input window 130 may include a graphical button that may be selected by the user to cause vendor device 101 to receive audio data (e.g., spoken speech) may then interpret the audio to determine the intended input.

In one implementation, data received via input window 130 may be encrypted and/or otherwise modified (e.g., condensed, filtered, etc.) by an encryption process 140 before being stored to main system memory and/or being forwarded to a server. For example, encryption process 140 may encrypt a telephone number, a credit card number, a customer's name, a customer's address, or other data may be encoded using symmetric key encryption, public key encryption, a substitution cipher, or other known encryption techniques. In the example shown in FIG. 1B, input data 102, that corresponds to a telephone number of "123-456-7890," has been encrypted by encryption process 140 to form encrypted data 103 that corresponds to an encrypted telephone number of "ABCDEFGH12345 . . . ". It should be appreciated that other types of encryption may be performed by encryption process 140.

In one implementation, portions of data received via input window 130 may be separately encoded by encryption process 140. For example, groups of numbers (e.g., groups of four numbers) may be separately received, encrypted by encryption process 140, and forward to a server in separate messages. For example, when a portion of input data 102 corresponding to a credit card number is received, by encryption process 140 may encrypt and forward the portion of the credit card number, and when another portion of the credit card number is received, encryption process 140 may separately encrypt and forward the other portion of the credit card number. For instance, encryption process 140 may separately encrypt and forward groups of four digits (or other subsets) of a credit card number. In one implementation, encryption process 140 may encrypt different sized portions of input data 102 and/or may use different encryption techniques for the different portions. For example, encryption process 140 may encrypt a portion of input data 102 using a first encryption key and may encrypt another portion of input data 102 using a second, different encryption key.

Vendor device 101 may separately encrypt and transmit encrypted data 103 to a separate device, such as a server for processing payments, storing encrypted data 103, processing an online order, etc. For example, vendor device 101 may establish a secure channel (e.g., using a HTTPS or other secure transmission protocol) that encrypts transmitted data using a secure socket layer encryption and forwards the encrypted data via the secure channel. Thus, encrypted data 103 (that is encrypted by encryption process 140 using a first encryption protocol, such as public key encryption) may be encrypted by vendor device 101 a second time for transmission via the secure channel. For example, vendor device 101 may re-encrypt encrypted data 103 a second time using a second encryption protocol, such as SSL, that differs from the encryption protocol used by encryption process 140.

FIG. 1C shows UI 100-C in which input window 130 is removed (e.g., based on receiving input data 102). In UI 100-C, input field 120 has been auto-populated with encrypted data 103 (e.g., the encrypted telephone number of "ABCDEFGH12345 . . . ") and encrypted data 103 may be stored on vendor device 101 and/or forwarded to a server device. The server device may receive additional data, such as a decryption code or data identifying the vendor device 101, that allows the server device to decrypt encrypted data 103 to service the user. For example, different encryption keys may be associated with different vendor devices 101, and the server device may identify a correct encryption key to use to decrypt encrypted data 103 based on a vendor device identifier transmitted with or in connection with encrypted data 103. However, the user's actual input data 102 (e.g., the phone number of "123-456-7890") may not be stored or otherwise be available on vendor device 101 and/or the server. In this way, input data 102 may be more secure (e.g., less likely to be acquired by an unauthorized party).

Furthermore, the encrypted data 103 may be stored by vendor device 101 and/or the server to provide various functions and benefits. For example, in future interactions with UI 100 (e.g., when the user makes another purchase through an on-line vendor), the server device may use stored encrypted data 103, and/or vendor device 101 may automatically populate input field 120 with stored encrypted data 103. In one implementation, vendor device 101 may change the encryption key periodically (e.g., daily), and may include, with encrypted data 103, information identifying a time when the encrypted data 103 was formed/stored, an encryption key or other information used to generate encrypted data 103, information identifying vendor device 101, etc. so that server device may identify a correct decryption key to recover input data 102.

FIGS. 1A-1C depict exemplary components of UI 100, but in other implementations, UI 100 may include fewer components, additional components, different components, or differently arranged components than illustrated in FIGS. 1A-1C. Furthermore, one or more components of UI 100 may perform one or more tasks described as being performed by one or more other components of UI 100.

Figure 2:
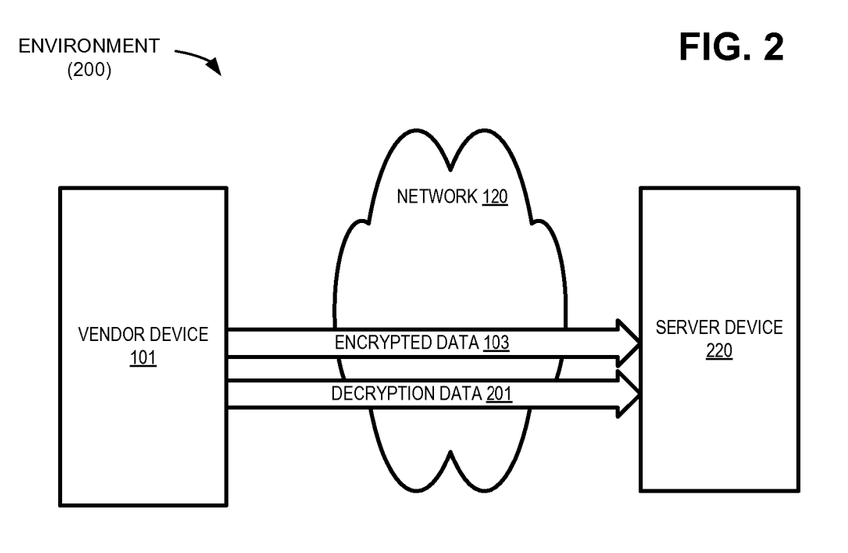
FIG. 2 shows an exemplary environment in which systems and/or methods described herein may be implemented to present the UI shown in FIGS. 1A-1C.

FIG. 2 shows an exemplary environment 200 in which systems and/or methods described herein may be implemented. As shown in FIG. 2, environment 200 may include vendor device 101 that exchanges data via one or more wireless networks 210 to a server device 220.

Vendor device 101 may include any type of computational device, such as a personal computer (PC), laptop computer, tablet computer, personal digital assistant, cell phone, etc., that is capable of transmitting data (e.g., emails, text messages, instant messages, facsimiles, etc.), video data (e.g., video calls, video chats, video messages, etc.) and/or voice data (e.g., voice calls) to/from a network, such as network 210. It should be appreciated, however, that the term "vendor device" is intended to include any type of computing and/or communications device that is able to receive data from a user and encrypt the received data before the data is stored and/or transmitted from the device.

Network 210 may be a communications network and/or data network that vendor device 101 to server device 220. For example, network 210 may include a local area network (LAN), a wide area network (WAN), a metropolitan area network (MAN), a wireless network, an optical fiber (or fiber optic) network, or a combination of networks. In addition or alternatively, network 210 may be included in a radio network capable of supporting wireless communications to/from one or more devices in environment 200, and the radio network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or a network implemented in accordance with future wireless network standards. In another implementation, network 210 may be included in one or more private Internet Protocol (IP) networks that use a private IP address space.

Server device 220 may exchange data with vendor device 101 to receive encrypted data 103. In one example, vendor device may forward encrypted data 103 via a secure, encrypted channel. For example, encrypted data 103 (that has been encrypted within input window 130 by encryption process 140) may be encrypted a second time vendor device 101 for transmission to server device 220. Server device 220 may further receive, via network 210, decryption data 201 that may be used by server device 220 to decrypt encrypted data 103. For example, decryption data 201 may include a decryption key, decryption code, or the other data for decrypting encrypted data 103. In another example, decryption data 201 may include information identifying vendor device 101 and/or a time when the encrypted data 103 was generated so that server device 220 may identify a correct decryption key for recovering input data 102.

Although FIG. 2 shows exemplary components of environment 200, in other implementations, environment 200 may include fewer components, different components, differently arranged components, or additional components than depicted in FIG. 2. Alternatively, or additionally, one or more components of environment 200 may perform one or more other tasks described as being performed by one or more other components of environment 200. For example, system 200 may further include an intermediate decryption device (not shown) that receives and decrypts encrypted data 103 and forwards the resulting decrypted data (e.g., input data 102) to server device 220.

Figure 3:
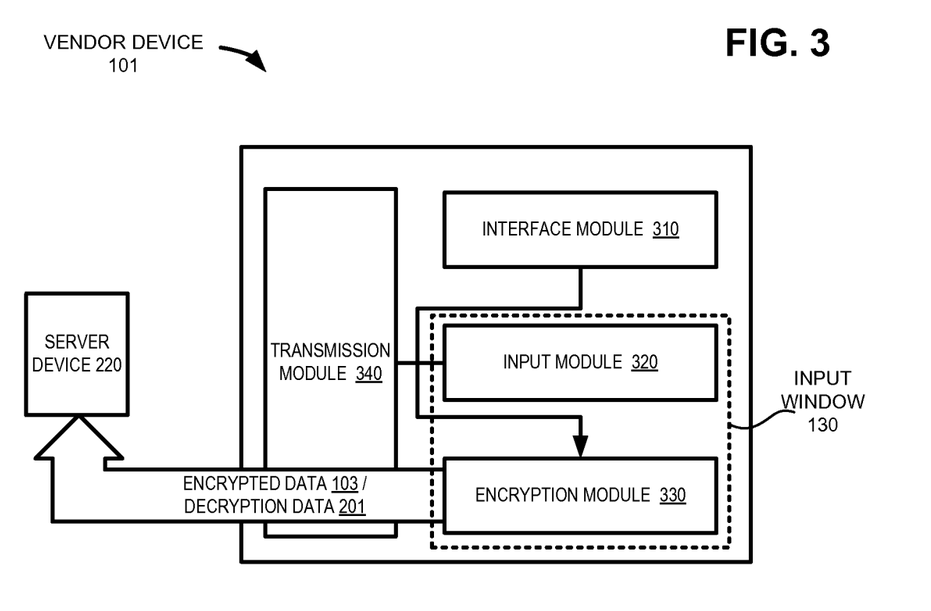
FIG. 3 shows exemplary functional modules that may be included in the user device shown in FIGS. 1A-1C.

FIG. 3 is a schematic diagram illustrating exemplary components of vendor device 101 according to one implementation. As shown in FIG. 3, vendor device 101 may include an interface module 310, an input module 320, an encryption module 330, and a transmission module 340.

Interface module 310 may present UI 100-A (e.g., a web form) that includes input prompt 110 and/or input field 120 as described above with respect to FIG. 1A. For example, interface module 310 may receive data (e.g., via transmission module 340) from server device 220 that includes the content of UI 100. For example, interface module 310 may include a browser application that receives web data (e.g., interface data) from server device 220 and presents, as UI 100, one or more web pages.

Input module 320 may cause (e.g., via interface module 310) input window 130 to be selectively presented. For example, input module 320 may present input window 130 in connection with presenting input prompt 110 and/or input field 120. In another example, input module 320 may cause input window 130 to be presented when the user begins to input data (e.g., when the user clicks on or otherwise selects input field 120). Input module 320 may receive input data 102 via input window 130. For example, if input window 130 corresponds to a graphical representation of virtual keypad (as shown in FIG. 1B) or a virtual keyboard, input module 320 may detect the user's selection (e.g., via a input device such as mouse or a touch pad) of portions of the graphical representation and identify, as input data 102, alphanumeric characters associated with the select portions.

Encryption module 330 may encrypt input data 102 to form encrypted data 103 using various encryption techniques, such as a substitution cipher encryption, a symmetrical-key encryption and/or a public-key encryption. As shown in FIG. 3, input module 320 and encryption module 330 may be incorporated into input window 130 so that unencrypted input data 102 is not available outside of input window 130 (e.g., to interface module 310 and/or transmission module 340). In one implementation, encryption module 330 may separately encrypt portions of the input data 102. Furthermore, encryption module 330 may encrypt different portions of input data using different encryption keys and/or different encryption techniques.

In one implementation, encryption module 330 may forward information to server device 220 and this information may be used to decrypt encrypted data 103. For example, encryption module 330 may forward information identifying an encryption scheme and other data (e.g., a decryption key) that may be used by server device 220 to decrypt encrypted data 103.

Transmission module 340 may transmit the different portions of encrypted data 103. For example, transmission module may forward portions of encrypted data 103 to server device 220 in different packets and/or in different sessions. In one example, transmission module 340 may forward encrypted data 103 via a secure channel (e.g., using Hypertext Transfer Protocol (HTTP) within a connection encrypted by Transport Layer Security (TLS)).

FIG. 3 depicts exemplary functional components of vendor device 101, but in other implementations, vendor device 101 may include fewer functional components, additional functional components, different functional components, or differently arranged functional components than those illustrated in FIG. 3. Furthermore, one or more functional components of vendor device 101 may perform one or more tasks described as being performed by one or more other functional components of vendor device 101.

Figure 4:
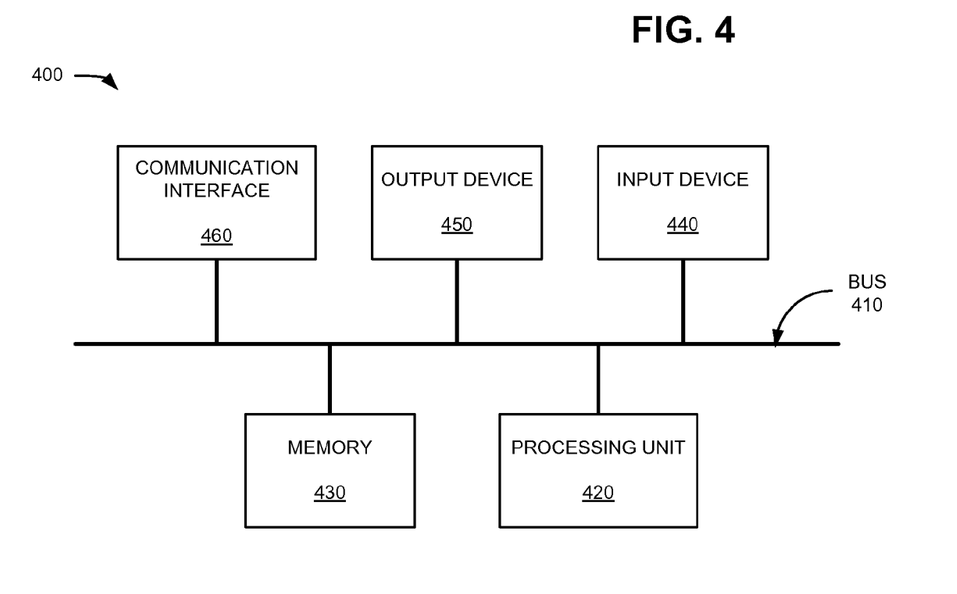
FIG. 4 shows a diagram of exemplary components that may be included in an computing device included in the environment shown in FIG. 2.

FIG. 4 is a schematic diagram illustrating exemplary components of a computing device 400. Vendor device 101, a component of network 210, and/or server device 220 may each include one or more computing devices 400. As shown in FIG. 4, computing device 400 may include a bus 410, a processing unit 420, a memory 430, an input device 440, and output device 450, and a communication interface 460.

Bus 410 may include a path that permits communication among the components of computing device 400. Processing unit 420 may include a processor, a microprocessor, or processing logic that may interpret and execute instructions. Memory 430 may include any type of dynamic storage device that may store information and instructions, for execution by processing unit 420, and/or any type of non-volatile storage device that may store information for use by processing unit 420. Input device 440 may include a mechanism that permits a user to input information to computing device 400, such as a keyboard, a keypad, a button, a switch, etc. Output device 450 may include a mechanism that outputs information to user, such as a display (e.g., a liquid crystal display, a light emitting diodes (LED) based display, etc.), a speaker, etc.

Communication interface 460 may include any transceiver that enables computing device 400 to communicate with other devices and/or systems via wireless communications, wired communications, or a combination of wireless and wired communications. For example, communication interface 460 may include mechanisms for communicating with another device or system via a network. Communication interface 460 may include an antenna assembly for transmission and/or reception of radio-frequency (RF) signals. For example, communication interface 460 may include one or more antennas to transmit and/or receive RF signals over the air. Communication interface 460 may, for example, receive RF signals and transmit them over the air. In one implementation, for example, communication interface 460 may communicate with a network and/or devices connected to a network. Alternatively or additionally, communication interface 460 may be a logical component that includes input and output ports, input and output systems, and/or other input and output components that facilitate the transmission of data to other devices.

Computing device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Computing device 400 may include fewer components, additional components, different components, and/or differently arranged components than those illustrated in FIG. 4. Furthermore, one or more components of computing device 400 may perform one or more tasks described as being performed by one or more other components of computing device 400.

Figure 5:
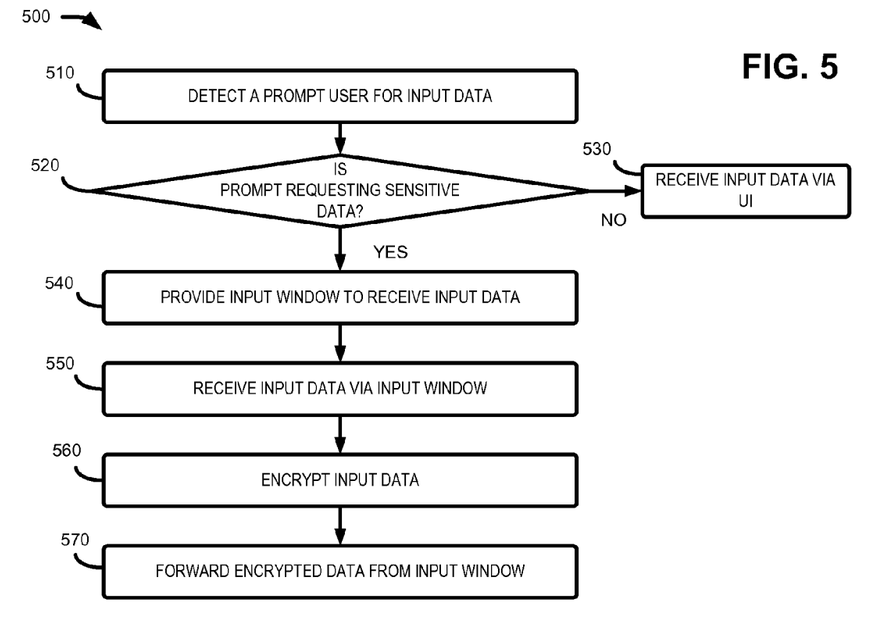
FIG. 5 shows a flow diagram illustrating an exemplary process for providing a secure input mechanism via the UI shown in FIGS. 1A-1C.

FIG. 5 is a flow diagram illustrating an exemplary process 500 for providing a secure input mechanism via UI 100. In other implementations, process 500 may be performed by one or more other devices of environment 200, such as vendor device 101 and/or server device 220.

As shown in FIG. 5, process 500 may include detecting a prompt for input data 102 (block 510), and determining whether the prompt includes a request for sensitive data (block 520). For example, in block 510, vendor device 101 may present UI 100-A (e.g., a web form) that includes input prompt 110 and/or input field 120, as described above with respect to FIG. 1A. In block 520, vendor device 101 may examine portions of text (e.g., input prompt 110) and/or metadata associated with UI 100 (e.g., metadata included in interface data), perform image recognition on one or more images and/or movies presented in UI 100, perform audio recognition of audio content presented in UI 100, etc., to determine whether UI 100 requests sensitive information. For example, vendor device 101 may store a list of terms associated with sensitive data, such as "credit card", "account number", "address", "Social Security number", "birthday," etc., and vendor device 101 may determine whether input prompt 110 and/or another portion of UI 100 includes or is otherwise associated with one or more entries in the stored list of terms.

As shown in FIG. 5, process 500 may include vendor device 101 collecting the requested input data without input window 130, such as via input field 120 (block 530), if the prompt is not requesting sensitive data (block 520—"No"). Otherwise, if input prompt 110 requests sensitive data (block 520—"Yes"), vendor device 101 may present input window 130. For example, as described above with respect to FIG. 1B, vendor device 101 may overlay input window 130 over input field 120 (e.g., to prevent the user from entering the requested input data using input field 120). As shown in FIG. 1B, input window 130 may correspond to or otherwise include a graphical representation of a virtual keyboard or other input device, to receive the requested sensitive input data 102.

As shown in FIG. 5, process 500 may include vendor device 101 receiving input data 102 via input window 130 (block 550). For example, if input window 130 corresponds to a graphical representation of virtual keypad (as shown in FIG. 1B) or a virtual keyboard, vendor device 101 may detect the user's selection (e.g., via a input device such as mouse or a touch pad) of portions of the graphical representation and identify, as input data 102, alphanumeric characters associated with the select portions. In another implementation, vendor device 101 may identify attributes of the user selection, such as the location, duration, pattern, or other aspects of the selection, and input data 102 may correspond to these attributes. By way of example, if user selects an upper right section of the virtual keypad shown in FIG. 1B (i.e., the section associated with number "1"), vendor device 101 may store, as input data 102, information identifying the upper right section of the virtual keypad.

As shown in FIG. 5, process 500 may further include vendor device 101 encrypting input data 102 (block 560) and forwarding encrypted data 103 to server device 220 (block 570). Vendor device 101 may encrypt input data 102, in block 540, to form encrypted data 103 using various encryption techniques, such as a substitution cipher encryption, a symmetrical-key encryption and/or a public-key encryption. As shown in FIG. 1C, vendor device 101 may populate input field 120 with encrypted data 103, and data associated with the populated UI 100 may be transmitted to server device 220. In one implementation, portions of the input data 102 may be separately encrypted and/or portions of input data 103 may be separately transmitted.

For example, if input data 102 corresponds to a ten-digit North American telephone number, an area code (e.g., the first 3 digits), a central office exchange (e.g., the middle 3 digits), and a station or line number (e.g., the last four digits) may be separately encrypted such that encrypted data 103 includes three separate encrypted data groupings. In one example, vendor device 101 may encrypt different portions of input data using different encryption keys and/or different encryption techniques. Vendor device 101 may transmit the different portions of encrypted data 103. For example, portions of encrypted data 103 may be transmitted to server device 220 in different packets and/or in different sessions.

Although input window 130 has been discussed herein (and depicted in FIG. 1B) as corresponding to a virtual keypad, it should be appreciated that input window 130 may include other input mechanisms to receive input data 102 from a user and encrypt input data 102 for transmission to server device 220. For example, as shown in FIG. 6, UI 100-B may present an exemplary handwriting input window 600 that receives an input via a user's finger or a pointer device, such as a stylus. Handwriting input window 600 may receive a contact pattern from the user and may interpret this contact pattern to identify an associated portion input data 102 (numbers "123" in FIG. 6). Handwriting input window 600 may then encrypt the portion of input data 102 in handwriting input window 600. For example, handwriting input window 600 may be displayed by vendor device 101 at a particular size that is selected to receive a set of input data 102 (e.g., a number of alphanumeric characters), and handwriting input window 600 may encrypt and forward the received set of input data 102.

Figure 7A:
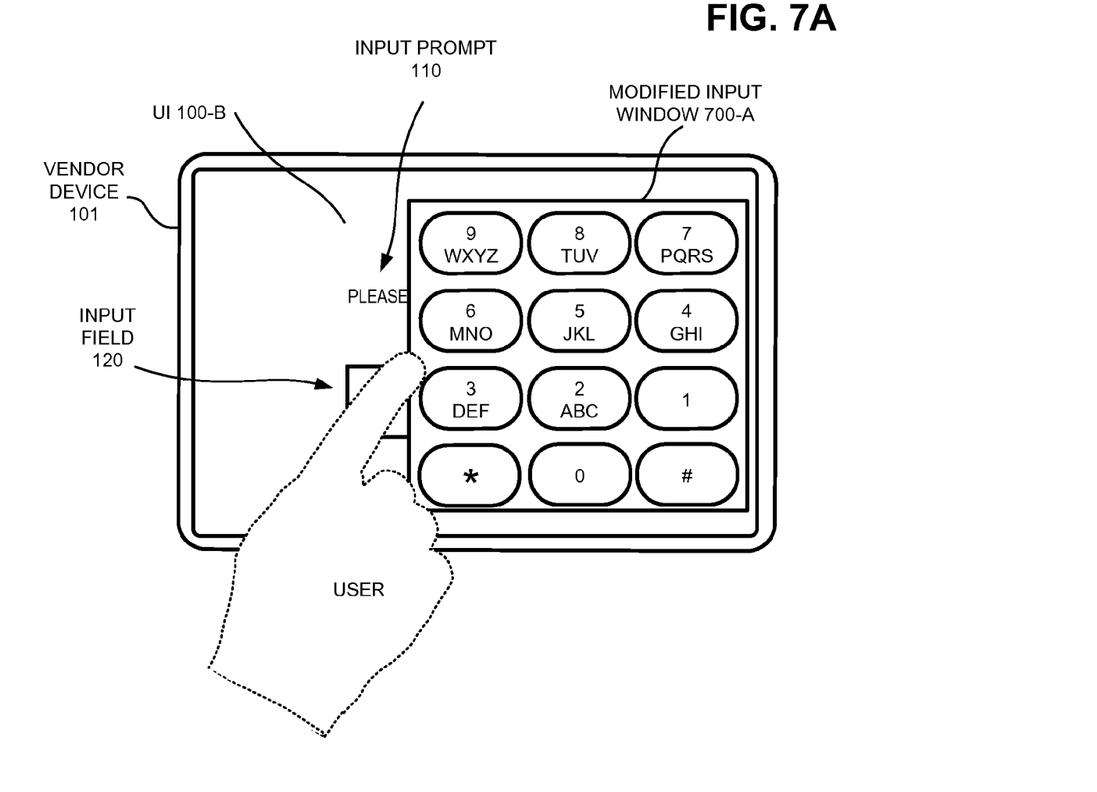
Figure 7B:
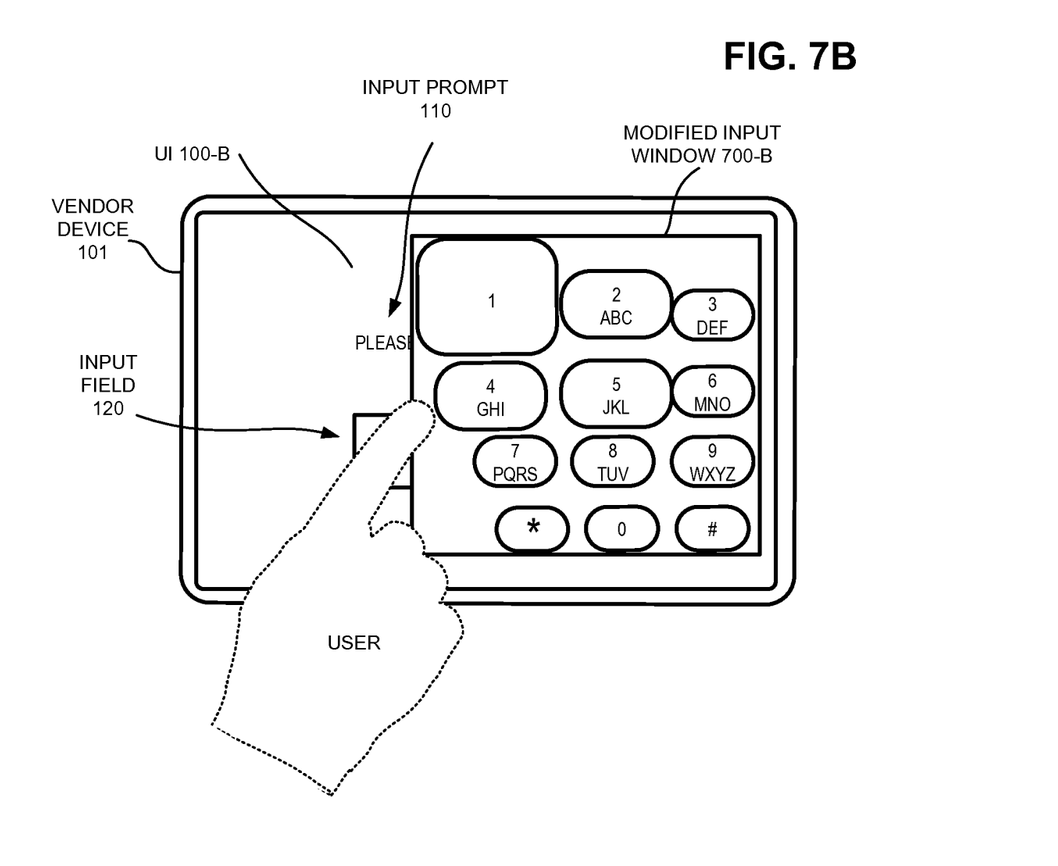

In other examples, input window 130 may correspond to a virtual keypad (or other input mechanism such a virtual keyboard) but may be modified as desired to provide improved security and/or other benefits (e.g., an improved readability to the user). For example, as shown in FIGS. 7A and 7B, UE 100-B may include exemplary modified input windows 700 (shown in FIG. 7A as modified input window 700-A and in FIG. 7B as modified input window 700-B). As previously described with respect to FIG. 1B, input window 130 may include graphical elements (e.g., virtual keys) that may be selected by the user to specify input data 102. In certain implementations, UI 100-B may include modified input window 700 in which one or more of the graphical elements in input window 130 are repositioned and/or modified. For example, as shown in FIG. 7A, modified input window 700-A may include graphical elements that have been repositioned so that associated numbers are presented from largest to smallest (in contrast to input window 130 shown in FIG. 1B in which the displayed graphical elements present associated numbers are presented from smallest to largest). In other examples, the graphical elements may be reordered in a different arrangement or may be randomly allocated. In one implementation, the positions of the graphical elements may be modified each time UE 100-B is presented. Modifying the positions of the graphical elements may provide improved security because each time the user inputs the same sensitive data (e.g., the user's credit card number) through UI 100-B, the user would select graphical elements located at different portions of the display in vendor device 101.

In another example shown in FIG. 7B, modified input window 700-B may include graphical elements that have been resized (in contrast to input window 130 shown in FIG. 1B in which the displayed graphical elements present associated numbers are presented with a substantially uniform size). In comparison to the virtual keypad in input widow 130, modified input window 700-B may include certain graphical elements that have been enlarged (e.g., an element associated with number "1"), and/or other graphical elements that have been reduced in size (e.g., elements associated with numbers "0", "3", "6", "7", "8", and "9" and symbols "*" and "#"). Furthermore, the resized graphical elements in modified input window 700-B may be repositioned. For example, a graphical element associated with number "3" has be moved relatively lower on the display of vendor device 101, and a graphical element associated with number "7" has be moved relatively right on the display. In addition to the size and position, other attributes associated with the graphical elements (e.g., shape, color, brightness, etc.) may also be adjusted. In one implementation, the visual attributes of the graphical elements may be modified each time UE 100-B is presented.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 5, the order of the blocks in process 500 may be modified in other implementations. Furthermore, non-dependent blocks may be performed in parallel. Furthermore, process 500 may include additional and/or fewer blocks than shown in FIG. 5.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

What is claimed is:

1. A method comprising:
    detecting, by a processor of a wearable user device, a textual prompt for user input data that is to be sent via a network to a server device, wherein the textual prompt includes an input field presented via a user interface (UI) of the wearable user device for an entry of the user input data;
    performing, by the processor, a comparison of the textual prompt to a stored list of terms associated with sensitive data;
    generating, by the processor, an input window comprising a graphical representation of a virtual keypad to receive the user input data based on a determination that the textual prompt requests at least some of the sensitive data based on the comparison, wherein the virtual keypad includes a set of first virtual keys forming a non-uniform alignment of at least one of a row or a column, and at least two of the first virtual keys differing in size;
    overlaying, by the processor, the input window on at least a portion of the input field to prevent the entry of the user input data into the input field;
    receiving, by the processor, the user input data via the input window;
    encrypting, by the processor, the user input data to form encrypted data;
    storing, by the processor, the encrypted data to a memory of the wearable user device, wherein the user input data is not stored to the memory; and
    forwarding, by the processor, a copy of the stored encrypted data via the network to the server device.

2. The method of claim 1, further comprising:
    detecting, by the processor, an other textual prompt for other user input data that is to be sent via the network to the server device, wherein the other textual prompt includes an other input field presented via the UI for an entry of the other user input data;
    performing, by the processor, an other comparison of the other textual prompt to the stored list of terms associated with the sensitive data;
    generating, by the processor, an other input window comprising another graphical representation of an other virtual keypad to receive the other user input data based on another determination that the other textual prompt requests at least some of the sensitive data based on the other comparison, wherein the other virtual keypad includes a set of second virtual keys that are re-sized and re-positioned relative to the first virtual keys to form another non-uniform alignment; and
    overlaying, by the processor, the other input window on at least another portion of the other input field.

3. The method of claim 1, wherein the method further comprises:
    receiving other user input data via the input field and not from the input window; and
    storing the other user input data to the memory.

4. The method of claim 1, wherein the at least two of the first virtual keys differ with respect to at least one of a shape, a color, or a brightness.

5. The method of claim 1, wherein the UI is associated with a web form, and wherein forwarding the encrypted data to the server device includes:

populating the web form with the encrypted data to form a populated form; and forwarding the populated form to the server device.

6. The method of claim 1, wherein the encrypting the user input data to form the encrypted data includes:

encrypting a first portion of the user input data to form first encrypted data, and encrypting a second portion of the user input data to form second encrypted data, and wherein the forwarding the encrypted data to the server device includes:

forwarding, to the server device, a first message that includes the first encrypted data; and forwarding, to the server device, a second message that includes the second encrypted data.

7. The method of claim 6, wherein the sensitive data relates to a credit card number, and wherein a first portion of the credit card number corresponds to the first encrypted data, and a second portion of the credit card number corresponds to the second encrypted data.

8. A wearable user device comprising:

a memory configured to store instructions; and a processor configured to execute one or more of the instructions to:

detect a textual prompt, presented via a user interface (UI) of the wearable user device, for user input data that is to be forwarded via a network to a server device, wherein the textual prompt includes an input field for an entry of the user input data;

perform a comparison of the textual prompt to a stored list of terms associated with sensitive data;

generate, based on a determination that the textual prompt requests at least some of the sensitive data based on the comparison, an input window comprising a graphical representation of a virtual keypad to receive the user input data, wherein the virtual keypad includes a set of first virtual keys forming a non-uniform alignment of at least one of a row or a column, and at least two of the first virtual keys differing in size;

overlay the input window on at least a portion of the input field to prevent the entry of the user input data into the input field;

receive the user input data via the input window;

encrypt the user input data to form encrypted data;

store the encrypted data to the memory, wherein the user input data is not stored to the memory; and forward, via the network, a copy of the stored encrypted data to the server device.

9. The wearable user device of claim 8, wherein the processor is further configured to:

detect an other textual prompt for other user input data that is to be sent via the network to the server device, wherein the other textual prompt includes an other input field presented via the UI for an entry of the other user input data;

perform an other comparison of the other textual prompt to the stored list of terms associated with the sensitive data;

generate an other input window comprising another graphical representation of an other virtual keypad to receive the other user input data based on another determination that the other textual prompt requests at least some of the sensitive data based on the other comparison, wherein the other virtual keypad includes a set of second virtual keys that are re-sized and re-positioned relative to the first virtual keys to form another non-uniform alignment; and overlay the other input window on at least another portion of the other input field.

10. The wearable user device of claim 8, wherein the processor is further configured to:

receive other user input data via the input field and not from the input window; and store the other user input data to the memory.

11. The wearable user device of claim 8, wherein the at least two of the first virtual keys differ with respect to at least one of a shape, a color, or a brightness.

12. The wearable user device of claim 11, wherein the processor, when generating the input window, is further configured to modify at least one of a position or a size of the first virtual keys as generated for a previous input of the user input data via the input window.

13. The wearable user device of claim 8, wherein the prompt is associated with a web form, and the processor, when forwarding the encrypted data to the server device, is further configured to:

populate the web form with the encrypted data to form a populated form; and forward the populated form to the server device.

14. The wearable user device of claim 8, wherein the processor, when encrypting the user input data to form the encrypted data, is further configured to:

encrypt a first portion of the user input data to form first encrypted data; and encrypt a second portion of the user input data to form second encrypted data, and wherein the processor, when forwarding the encrypted data to the server device, is further configured to:

forward, to the server device, a first message that includes the first encrypted data; and forward, to the server device, a second message that includes the second encrypted data.

15. A non-transitory computer-readable medium to store instructions, wherein the instructions comprise:

one or more instructions that, when executed by a processor associated with a virtual reality (VR) device worn by a user, cause the processor to:

detect a textual prompt, presented via a user interface of the VR device, for user input data that is to be forwarded via a network to a server device, wherein the textual prompt includes an input field for an entry of the user input data;

identify one or more terms associated with the textual prompt;

determine whether the one or more terms are associated with one or more terms from a stored list of terms associated with sensitive data;

generate an input window comprising a graphical representation of a virtual keypad to receive the user input data when the one or more terms are associated with sensitive data, wherein the virtual keypad includes a set of first virtual keys forming a non-uniform alignment of at least one of a row or a column, and at least two of the first virtual keys differing in size;

overlay the input window on at least a portion of the input field to prevent the entry of the user input data into the input field;

receive the user input data via the input window;

encrypt the user input data to form encrypted data;

store the encrypted data to a memory of the VR device, wherein the user input data is not stored to the memory; and forward, via the network, a copy of the stored encrypted data to the server device.

16. The non-transitory computer-readable medium of claim 15, wherein the one or more instructions further cause the processor to:

detect an other textual prompt for other user input data that is to be sent via the network to the server device, wherein the other textual prompt includes an other input field presented via the UI for an entry of the other user input data;

perform an other comparison of the other textual prompt to the stored list of terms associated with the sensitive data;

generate an other input window comprising another graphical representation of an other virtual keypad to receive the other user input data based on another determination that the other textual prompt requests at least some of the sensitive data based on the other comparison, wherein the other virtual keypad includes a set of second virtual keys that are re-sized and re-positioned relative to the first virtual keys to form another non-uniform alignment; and overlay the other input window on at least another portion of the other input field.

17. The non-transitory computer-readable medium of claim 15, wherein the one or more instructions further cause the processor to:

receive other user input data via the input field and not from the input window; and store the other user input data to the memory.

18. The non-transitory computer-readable medium of claim 15, wherein the at least two of the first virtual keys differ with respect to at least one of a shape, a color, or a brightness.

19. The non-transitory computer-readable medium of claim 15, wherein the prompt is associated with a web form, and the processor, when forwarding the encrypted data to the server device, is further configured to:

populate the web form with the encrypted data to form a populated form; and forward the populated form to the server device.

20. The non-transitory computer-readable medium of claim 15, wherein the one or more instructions, when causing the processor to encrypt the user input data to form the encrypted data, further cause the processor to:

encrypt a first portion of the user input data to form first encrypted data; and encrypt a second portion of the user input data to form second encrypted data, and wherein the one or more instructions, when causing the processor to forward the encrypted data to the server device, further cause the processor to:

forward, to the server device, a first message that includes the first encrypted data; and forward, to the server device, a second message that includes the second encrypted data.

\* \* \* \* \*